Jan. 7, 1969  D. M. FLYNN ETAL  3,421,066
DIRECT CURRENT POWER SUPPLY SYSTEM FOR EMERGENCY
LIGHTING SYSTEMS AND THE LIKE
Filed March 31, 1966
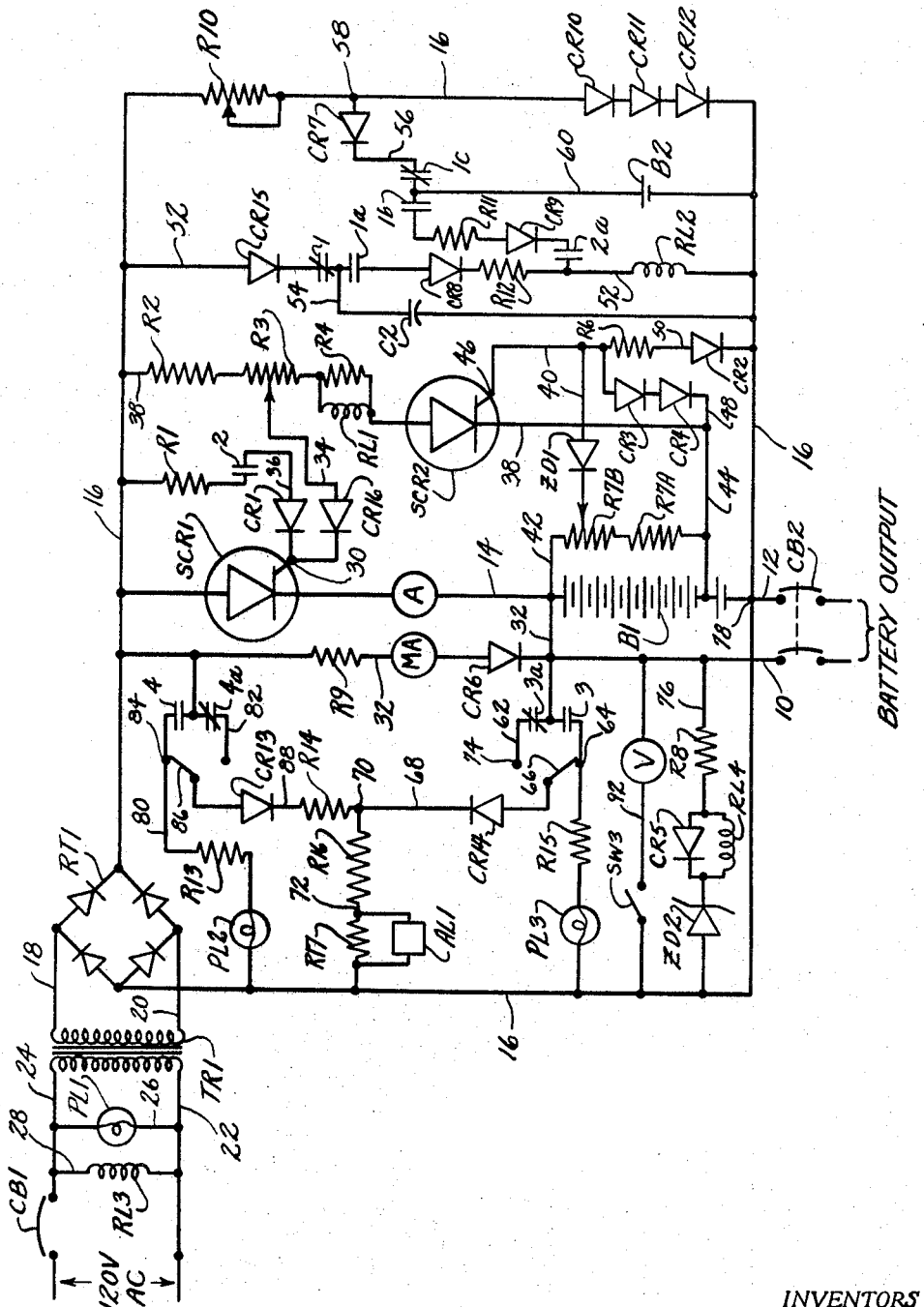
INVENTORS
DANIEL M. FLYNN
STANLEY J. BANDOSKI JR.
WILLIAM R. CLOW
BY McCormick, Paulding & Huber

United States Patent Office 3,421,066
Patented Jan. 7, 1969

3,421,066
DIRECT CURRENT POWER SUPPLY SYSTEM FOR EMERGENCY LIGHTING SYSTEMS AND THE LIKE
Daniel M. Flynn, Hampden, Stanley J. Bandoski, Jr., Springfield, and William R. Clow, Agawam, Mass., assignors to Hampden Engineering Company, East Longmeadow, Mass., a corporation of Massachusetts
Filed Mar. 31, 1966, Ser. No. 539,042
U.S. Cl. 320—6    25 Claims
Int. Cl. H02j 7/10; H01m 45/04

ABSTRACT OF THE DISCLOSURE

An emergency DC power supply system including a supply battery, a charging circuit therefor and AC and DC monitoring circuits. The charging circuit provides a fast charge, a second charge proportionate to the fast charge, and a trickle charge. A control battery is charged during the fast charge and discharges to regulate the proportionate second charge. The control battery also supplies energy to maintain circuit elements in condition for the second charge.

---

This invention relates generally to auxiliary or emergency lighting and power systems and, more specifically, to a direct current power supply system particularly adapted for use in emergency lighting systems but which also has general utility.

In emergency lighting and power systems of the type referred to, a direct current power supply, conventionally in the form of a comparatively large battery, is provided for the supply of electrical power for operation of emergency lights and other electrical devices; schools, hospitals, theaters and other public buildings requiring emergency exit lights and other devices as is well known. In accordance with the conventional practice, the direct current power supply systems include a battery charging circuit which maintains the battery in a charged condition of readiness and, in the event of malfunction in the normal alternating current power source and the resulting use of the emergency system thus discharging the battery, the battery charging circuit serves to recharge the battery on resumption of alternating current power. Such recharging operation is normally carried out in a first or "fast" charge or charging operation which continues until battery voltage reaches a predetermined level, and a second or "timed" charge or charging operation which commences after the first charge and which continues for a predetermined period of time. Thereafter a third or "trickle" charge occurs which provides a comparatively low current flow to the battery for sustaining the battery charge. Reference may be had to the Bembenek U.S. Patent No. 2,830,194, for a full description of a conventional direct current supply system including a battery charger adapted for a "fast" charge followed by a "timed" charge and a "trickle" charge.

While direct current power supply systems and battery chargers of the foregoing type have been generally satisfactory, there have been certain serious disadvantages encountered in their operation. The "timed" charge or charging operation blindly follows the "fast" charge for a fixed time period and even when a battery drain or discharge of very short duration has been encountered, a comparatively long "timed" charge ensues. Overcharging of the battery can of course result in detrimental effect on the battery and in any event a considerable waste of energy is encountered.

It is a general object of the present invention to provide a direct current power supply system including a battery charging circuit which exhibits a higher degree of intelligence than similar circuits heretofore provided and which provides for a second charge or charging operation following a "fast" or first charging operation in such manner that the second charge is of a duration as to be proportional to the period of the first or "fast" charge, thus eliminating detrimental overcharging of the battery and energy waste.

A further and more specific object of the invention resides in the provision of a direct current power supply and battery charging system which includes monitoring and alarm circuits for the alternating current source and the battery, the said circuits being supplied with operating power in an alternative manner and in each case by the power source which is not monitored thereby, a high degree of dependability thus being achieved in the circuits.

A still further and specific object of the present invention is to provide a supply system and circuit of the type referred to wherein solid state elements are employed to the extent possible with a minimum use of relays in critical areas of operation.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing is a schematic wiring diagram illustrating the direct current power supply system of the present invention.

A battery B1 shown in the drawing may of course vary widely in form within the scope of the invention but is shown as comprising a 27 cell nickel cadmium battery. The output side of the battery B1 comprises conductors 10, 12 which extend to a circuit breaker CB2 and thence to the emergency lights and other electrical devices comprising the emergency lighting system. The circuit breaker CB2, in accordance with the conventional practice, is arranged to prevent excessive discharge of the battery B1 and a relay, not shown, is normally provided to connect the battery automatically with the emergency lighting system on the occurrence of a failure or malfunction in the normal or alternating current system.

The battery B1 is connected in circuit with a rectifier RT1 by means of a conductor 14 across a conductor 16, 16 at the output side of the rectifier. Conductors 18, 20 extend from the input side of the rectifier RT1 to a transformer TR1 in turn connected by conductors 22, 24 with an alternating current power source. Circuit breaker CB1 provides overall protection for the power input to the direct current supply of the present invention and a pilot light PL1 is connected across the conductors 22, 24 in a conductor 26 whereby to provide a visual signal for a "power on" condition. A relay coil RL3, also connected across the conductors 22, 24 in a conductor 28 forms a part of a monitoring and alarm circuit to be described fully hereinbelow.

As will be apparent, the battery B1 is connected in the conductor or line 14 and in circuit with the rectifier RT1 and the alternating current source so as to be charged as required following a drain thereon by the emergency lighting and power system. In accordance with the invention, a controllable conducting means is provided in the line 14 to regulate charging of the supply battery B1 and, in the presently preferred form, said means comprises a unidirectional conducting element with a control terminal and, more particularly a silicone controlled rectifier SCR1. The silicone controlled rectifier SCR1 has its anode and cathode terminals in the conductor or line 14 and has a control or gate terminal 30 connected with a control circuit for the rectifier. The control circuit, to be described fully hereinbelow, selectively renders the rectifier SCR1 conductive and nonconductive to provide a first charge or charging operation wherein the battery voltage is elevated to a predetermined level, and also to provide a second charge or charging operation wherein the charging of the battery is continued for a period of time at least approximately in proportion to the time consumed in raising said battery voltage to said predetermined level. A third or "trickle" charge is also provided for on completion of the said second charging operation by means of a conductor 32 connected between the battery B1 and the line 16. A resistor R9 and diode CR6 in the conductor 32 provides the necessary drop to give the desired low magnitude charge sustaining or "trickle" current flow to the battery B1. Preferably there is also provided in line 32 a milliammeter to provide a convenient visible indication of correct "trickle" charge.

In the control circuit for the silicone controlled rectifier SCR1, alternative paths are provided for the necessary positive voltage signal to the gate or control terminal 30. A first control conductor 34 extends to a variable resistor R3 and has disposed therein a diode CR16. A second conductor 36, having a diode CR1 therein, extends to a set of relay contacts 2 and thence through resistor R1 to the aforementioned line 16. The resistor R1 provides for a positive voltage signal of the proper magnitude to the gate terminal 30 of the silicone controlled rectifier SCR1 when the relay contacts 2 are closed. The diodes CR1 and CR16 prevent a reverse current flow such as would result in loss of the desired positive gate signal in the alternative paths. Resistors R2 and R3 provide for a positive gate signal of proper magnitude to the conductor 34 and they also provide for removal of such signal in a manner to be described hereinbelow. In the system condition shown, the silicone controlled rectifier SCR1 is rendered conductive by reason of the positive signal at its gate 30 supplied through the conductor 34 and the conductor 38 extending to the aforementioned rectifier output line 16. Thus, the system is shown in the first or "fast" charge operation.

Further in accordance with the present invention, the control circuit for the silicone controlled rectifier SCR1 comprises a voltage responsive means connected with the battery B1, an energy storage means adapted respectively to charge during the first charge operation and to discharge and control the duration of the second charge operation, and a trigger means operable to cause said energy storage means to commence its discharge operation.

The said voltage responsive means preferably comprises a Zener diode ZD1 connected in a line 40 which extends to variable resistor R7B connected to the battery B1 input by conductor 42 and associated with a second resistor R7A in turn connected to a battery low voltage tap line 44. The conductor 40 extends to the control or gate terminal 46 of a second unidirectional conducting element which preferably takes the form of a silicone controlled rectifier SCR2 and which has its anode and cathode terminals disposed in the aforementioned conductor 38. From the cathode of the silicone controlled rectifier SCR2 the line 38 extends to the battery tap line 44 whereby to provide a low voltage such that the gate to cathode voltage of the rectifier SCR2 is back biased and the rectifier is rendered nonconductive at low battery voltages. As charging of the battery continues in the system condition shown and as a predetermined voltage level is reached, the Zener diode ZD1 will of course become conductive whereupon the gate to cathode voltage at the rectifier SCR2 will become sufficiently positive to render the rectifier conductive.

Still referring to the rectifier SCR2 and the line 38, it will be observed that a first switching means is provided and comprimises a coil RL1 of a first relay means disposed in the said line and that a resistor R4 is provided to prevent excessive current flow through the said coil. A conductor 48, connected with the line 38 at its junction with the battery tap line 44, extends to a line 50 and has disposed therein diodes CR3 and CR4 which limit the voltage across the gate of the rectifier SCR2. The conductor 50 extends from the aforementioned line 40 to the rectifier output line 16 and has disposed therein a resistor R6 and a diode CR2. The connection of the conductor 40 to the conductor 16 via the line 50 through resistor R6 and diode CR2 provides for an effective negative voltage signal at the gate 46 of the silicone controlled rectifier SCR2 prior to firing of the Zener diode ZD1 since the cathode of the rectifier is connected by the lines 38 and 44 to a low positive battery voltage as aforesaid. Such negative voltage signal serves to bias the silicone controlled rectifier SCR2 and to render the same nonconductive whenever a positive signal to the gate is removed.

As mentioned above, the first control conductor 34 is connected with the resistor R3 and the line 38 and in the system condition shown provides a positive signal to the gate 30 of silicone controlled rectifier SCR1 whereby to render the same conductive for the first battery charging operation. When the aforesaid predetermined level of battery voltage is attained, as determined by the adjustable resistor R7B, and when the Zener diode ZD1 fires as stated whereby to provide the necessary positive signal at the gate terminal 46 of the silicone controlled rectifier SCR2 to render the same conductive, current flow commences through the resistors R2 and R3 in the line 38 such that the drop through the resistor R2 and a portion of the resistor R3 renders the voltage signal at the gate terminal 30 effectively negative. Thus, the silicone controlled rectifier SCR1 is rendered nonconductive and the first or "fast" rate of battery charge is termined.

A conductor 52 forms a part of the aforementioned trigger means and energy storage means and has disposed therein a diode CR15, first and second sets of contacts 1 and 1a for the aforementioned relay RL1, a diode CR8, a resistor R12 and a relay coil RL2 forming a part of a second switching or relay means. Connected with the conductor 52 between the contacts 1 and 1a is a conductor 54 which has disposed therein a temporary energy supply means comprising a capacitor C2 and which extends therefrom to the output line 16 of the rectifier RT1. Also connected with the conductor 52 and betwen the resistor R12 and relay coil RL2 therein, is a conductor 56 which extends therefrom to the rectifier output line 16 at a junction 58 between a resistor R10 and diodes CR10, CR11, and CR12. A diode CR7 is disposed in the line 56 adjacent the junction 58 and said line extends therefrom to contacts 1C and 1B of relay RL1, resistor R11, diode CR9 and finally to contacts 2A of relay RL2 adjacent the connection of line 56 to the conductor 52. Finally, a line 60 extends from the conductor 56 between the relay contacts 1B and 1C to the rectifier output line 16 and disposed therein is a comparatively small control battery B2.

As illustrated, the trigger means and the energy storage means are in the first or "fast" charging operation and the aforedescribed energization of the relay coil RL1 has not yet occurred. Thus, the relay contacts 1 are closed as shown and current flows through the conductor 52, the diode CR15, the contacts 1 and the conductors 52, 54 to charge the capacitor C2. Similarly, the energy storage means or battery B2 is charged during the first or "fast"

charging operation by current flow through the resistor R10, the diode CR7, the line 56, and the closed relay contacts 1C and line 60. As will be apparent, the charging of the capactor C2 and the control battery B2 occurs over a period of time and in proportion to the duration of the first or "fast" charge operation of the battery B1.

On energization of the relay coil RL1 as described above on termination of the first or "fast" charging operation of the battery B1, relay contacts 1 are opened and contacts 1A are closed. The capacitor C2 is then permitted to discharge in a "trigger" operation through the line 54, the contacts 1A, the diode CR8, the resistor R12, and the coil RL2 to the rectifier output line 16. Further, the contacts 1C are opened and the contacts 1b closed whereupon the battery B2 is permitted to discharge through the line 60, the contact 1b, the resistor R11, the diode CR9, the contacts 2A which are closed on energization of relay coil RL2, the coil RL2 and the line 52 to the rectifier output line 16. Still further, the energization of the relay coil RL2 closes the contacts 2 in the aforementioned second control condutor 36 and a positive gate signal is returned to the gate terminal of the silicone controlled rectifier SCR1 through the said control conductors, the resistor R1, the contacts 2 and the diode CR1.

As will be apparent, the return of the positive voltage signal to the gate 30 of the silicone controlled rectifier SCR1 will result in said rectifier being rendered conductive and a resumption of charging of the battery B1. Such second charging operation of the battery continues for a period of time which is dependent upon the battery B2 maintaining the coil RL2 in an energized condition. When the said battery has discharged sufficiently to permit the coil to become deenergized, the contacts 2 reopen, the silicone controlled rectifier SCR1 is rendered nonconductive and the second charge or charging operation is terminated whereupon the third or "trickle" charging operation commences and maintains the battery B1 in a ready condition for further emergency use.

With regard particularly tot he individual elements in the trigger means and the energy storage means, it will be observed that the diode CR15 serves to eliminate arcing at the contacts 1 and 1A such as might otherwise be caused by the capacitor C2. The diode CR8 prevents a flow of current from the battery B2 through the lines 60, 56 and 54 to the capacitor C2 during the second charging operation. Resistor R12 is a current limiter which retards the discharge of the capacitor C2 through the relay coil RL2 for a sufficient time to permit the control battery B2 to take over and maintain energization of the said coil. Resistor R10 permits adjustment of the rate of charge of the control battery B2 during the first or "fast" charging operation and thus adjusts the desired proportionality of the second charging operation to the first charging operation. Diodes CR7, CR10, CR11, and CR12 serve to "clamp" the charging voltage of the control battery B2. Resistor R11 is a current limiting resistor to maintain a desired rate of discharge of the control batter B2 during the second charging operation. Diode CR9 prevents the discharge current of capacitor C2 from passing through the conductor 56 during the trigger portion of the second charging operation. Further, the said diode provides a small forward voltage drop during the discharge of the control battery B2 which aids in limiting the discharge rate and which contributes to a clean dropout characteristic of the relay coil RL2.

In further accord with the present invention, a first monitoring and alarm circuit is provided for the alternating current power source and its associated circuitry. Said circuit comprises a malfunction responsive means and an alarm means connected therewith and operable thereby on power provided by the aforesaid supply battery B1. In the presently preferred form of the invention, the malfunction responsive means comprises the aforementioned coil RL3 and the conductor 28 between the conductors 22 and 24. The relay coil RL3 has contacts 3 and 3A disposed respectively in the aforementioned line 32 and in a short branch line 62 extending therefrom. The line 32 has disposed therein a visual alarm comprising pilot light PL3 and an associated resistor R15 and extends from the aforesaid line 14 at the input side of the battery B1 to the output line 16 of the rectifier RT1. The set of contacts 3 in the line 32 is normally open as shown when the alternating current power source and its associated circuitry is in its proper and efficient operation. On failure or malfunction in the alternating current power source or its associated circuitry, the relay coil RL3 is deenergized whereupon the contacts 3 are closed and the pilot light PL3 is energized. Further, a contact 64 is disposed in the line 32 and a manually operable switching means comprising a member 66 is associated therewith and with a conductor 68 extending to a junction 70, a resistor R16 in a line 72, a resistor R17, and an audio alarm in the form of a buzzer AL1 in parallel with the said line 72. As will be apparent, the audio alarm buzzer AL1 will also sound on failure or malfunction in the alternating current power source or its circuitry. On manual manipulation of the switch member 66 to move the same out of engagement with the contact 64 and into engagement with the contact 74 in the aforementioned line 62, the audio alarm is silenced. On resumption of alternating current power, the relay coil RL3 will be energized whereupon the contacts 3 will be opened and the contacts 3A will be closed to again sound the audio alarm. Further manual manipulation of the switch member 64 can then be accomplished to return the said member to engagement with the contact 64 in the line 32 whereupon the circuit is armed for both visual and audio alarm on alternating current malfunction or failure.

Diode CR14 serves to prevent a reverse flow of current through the line 68, the switch member 66, the contact 64 and the line 32 as might result in inadvertent or unintentional energization of the pilot light PL3. Resistors R16 and R17 cooperate with resistor R14 in a voltage divider arrangement to provide the proper voltage across the buzzer alarm AL1.

A conductor 76 forms a part of a second monitoring and alarm circuit and extends between the aforementioned conductors 10 and 16, the latter of which is connected with the battery output 12 at a junction 78. Thus, battery B1 output voltage is applied across the line 76 which has disposed therein Zener diode ZD2, diode CR5 and relay coil RL4 in parallel, and resistor R8. When the supply battery is in its normal charged condition, relay coil RL4 has open contacts 4 and closed contacts 4A, the former being disposed in a line 80 extending between the lines 10 and 16 and the latter in a short branch line 82 extending from the line 80. The line or conductor 80 has disposed therein switch contact 84, resistor R13 and visual alarm means in the form of a pilot light PL2. A switch member 86 is associated with the contact 84 and with a line 88 extending therefrom to a diode CR13 and the aforementioned resistor R14 and junction 70.

In operation of the second monitoring and alarm circuit, a battery voltage falling below a predetermined level as determined by the Zener diode ZD2, results in shut-off and termination of current flow through the Zener diode ZD2, consequent deenergization of the relay coil RL4, and in closing of the relay contacts 4 and opening of the relay contacts. 4A. On closing of the contacts 4, the pilot light PL2 is energized and the audio alarm in the form of a buzzer AL1 is sounded. As will be apparent, a circuit is completed through the switch member 86, the conductor 88, the diode CR13, the resistor R14, the resistor R16, and line 72 to the line 16 for sounding of the buzzer AL1. On manual manipulation of the switch member 86 to move the same away from the contact 84 and into engagement with a contact 90 in the line 82, the buzzer AL1 is, of course, silenced but is sounded again on resumption of a battery voltage in excess of the aforesaid predetermined level.

In addition to the milliammeter MA mentioned above, there is preferably provided an ammeter A in the aforementioned line 14 and a conductor 92 is provided between the lines 10 and 16 and has disposed therein a voltmeter V. Further, a switch SW3 is provided in the conductor 92 so as to permit intermittent and selective reading of the voltmeter.

We claim:

1. A direct current electrical power supply system adapted for use in emergency lighting systems and the like in association with an alternating current power source, said power supply system comprising a rectifier means, a supply battery having an output side connectible with an emergency lighting system or the like, conductor means connecting an input side of said battery in circuit with said rectifier means and connecting the latter with said alternating current power source, and means for regulating charging of said supply battery comprising at least one controllable conducting means, said means being connected in said conductor means so as to regulate the flow of charging current to said supply battery, and said charging regulating means also comprising a control circuit connected with said conducting means and with said supply battery and operable selectively to render said means conductive and nonconductive, said control circuit also including a means operable in response to a supply battery voltage to render said conducting means conductive for a first battery charging operation when said battery voltage is below a predetermined level and until said voltage level is attained, said control circuit including said voltage responsive means being further operable when said predetermined battery voltage is attained to render said conducting means conductive for a second battery charging operation for a period of time at least approximately in proportion to the time consumed in raising said battery voltage to said predetermined level, said control circuit also including an electrical energy storage means connected in circuit so as to receive an electrical charge during said first battery charging operation and to discharge during said second battery charging operation, the duration of the discharge period of said energy storage means being employed to regulate the period of said second charging operation in proportion to said first charging operation as aforesaid, and said control circuit also including trigger means comprising a temporary energy supply means and first and second switching means connected in circuit with said voltage responsive means and said energy storage means and said conducting means; said temporary energy supply means being caused by said voltage responsive means and said first switching means when said battery voltage attains said predetermined level to operate said second switching means to assume a condition wherein it renders said conducting means conductive and causes said energy storage means to commence discharging as aforesaid, and said second switching means being thereafter maintained in said condition by discharge of said energy storage means substantially throughout the period of such discharge.

2. A direct current electrical power supply system as set forth in claim 1 wherein said temporary energy supply means comprises a capacitor and wherein said first and second switching means comprise first and second relay means.

3. A direct current electrical power supply system as set forth in claim 1 wherein said conducting means takes the form of a first silicone controlled rectifier having its gate terminal in circuit with said control circuit.

4. A direct current electrical power supply system as set forth in claim 3 wherein said voltage responsive means comprises a second silicone controlled rectifier and a Zener diode in circuit with the gate terminal thereof, said Zener diode also being in circuit with and responsive to a voltage of said supply battery so as to render said second rectifier conductive on attainment of said predetermined level of battery voltage during said first charging operation, and said second rectifier also being in circuit with said first switching means so as to condition the same as aforesaid when rendered conductive by said Zener diode.

5. A direct current electrical power supply system as set forth in claim 4 wherein said second silicone controlled rectifier is connected in circuit with a low voltage tap on said supply battery so as to be back biased and rendered nonconductive when said battery voltage is below said predetermined voltage.

6. A direct current electrical power supply system as set forth in claim 5 wherein said second silicone controlled rectifier is connected in circuit with a control conductor for said gate terminal of said first silicone controlled rectifier in such manner that said first silicone controlled rectifier is rendered nonconductive when said second silicone controlled rectifier is rendered conductive.

7. A direct current electrical power supply system as set forth in claim 6 wherein a second control conductor for said gate terminal of said first silicone controlled rectifier is provided and is associated with said second switching means, said switch means serving to complete a circuit through said second control conductor and to render said first silicone controlled rectifier conductive when said temporary energy supply means operates as aforesaid.

8. A direct current electrical power supply system as set forth in claim 7 wherein said first switching means comprises a relay having a coil in circuit with said second silicone controlled rectifier and energized and deenergized respectively when said silicone controlled rectifier is rendered conductive and nonconductive, said relay having first and second sets of contacts in circuit respectively with said temporary energy supply means and said second switching means, and third and fourth sets of contacts respectively in circuit with said second switching means and said energy storage means.

9. A direct current electrical power supply system as set forth in claim 8 wherein said second switching means comprises a relay having its coil in circuit with said second set of contacts of said first relay and respectively energized and deenergized on energization and deenergization of said first relay coil, said second relay having first and second sets of contacts in circuit respectively with said second control conductor and with said second relay coil.

10. A direct current electrical power supply system as set forth in claim 1 and including a first monitoring and alarm circuit for said alternating current power source and its associated circuitry, said circuit comprising a malfunction responsive means connected in circuit with the alternating current source and circuitry and an alarm means connected in circuit with and operable in response to said malfunction responsive means, said monitoring and alarm circuit being further connected in circuit with said supply battery for a direct current power supply for operating said alarm means on malfunction in said alternating current power source or circuitry.

11. A direct current electrical power supply system as set forth in claim 10 wherein said alarm means comprises an audio alarm and a manually operable switch means connected in circuit with said malfunction responsive means and said supply battery in such manner that the alarm will normally sound in response to alternating current malfunction with the switch means serving thereafter on manual manipulation to silence the alarm.

12. A direct current electrical power supply system as set forth in claim 11 wherein said alarm means also includes a visual alarm.

13. A direct current electrical power supply system as set forth in claim 12 wherein said alternating current malfunction responsive means comprises a relay having a coil in circuit with said alternating current source and a set of contacts in circuit with said audio and visual alarms.

14. A direct current electrical power supply system as set forth in claim 1 and including a monitoring and alarm circuit for said supply battery and associated circuitry, said circuit comprising a malfunction responsive means connected in circuit with said supply battery and circuitry and an alarm means connected in circuit with and operable by said malfunction responsive means, said monitoring and alarm means being further connected in circuit with said alternating current power source for operating said alarm means on malfunction in said battery and circuitry.

15. A direct current electrical power supply system as set forth in claim 14 wherein said malfunction responsive means comprises a Zener diode and a relay means connected in circuit with said supply battery and circuitry, said Zener diode serving to monitor voltage in said battery and circuitry and causing said relay means to operate said alarm means when said battery and circuitry voltage falls below a predetermined level.

16. A direct current electrical power supply system as set forth in claim 15 wherein said alarm means comprises an audio alarm and a manually operable switch means connected in circuit with said Zener diode and relay means and said alternating current power source in such manner that the alarm will normally sound in response to battery and circuitry voltage below said predetermined level with the said switch means serving thereafter on manual manipulation to silence the alarm.

17. A direct current electrical power supply system as set forth in claim 16 wherein said alarm means also includes a visual alarm.

18. A direct current electrical power supply system as set forth in claim 17 wherein said relay means comprises a coil connected in circuit with and operable by said Zener diode and a set of contacts in circuit with said audio and visual alarms.

19. A direct current electrical power supply system as set forth in claim 1 and including first and second monitoring and alarm circuits respectively for said alternating current power source and associated circuitry and for said supply battery and associated circuitry, each of said monitoring and alarm circuits comprising a malfunction responsive means and said means being connected respectively with said alternating current power source and circuitry and said supply battery and circuitry, said monitoring and alarm circuits further including an alarm means, and said alarm means being connected in circuit for operation by said supply battery and said alternating current source respectively in response to malfunction in said alternating current source and circuitry and said supply battery and circuitry.

20. A direct current electrical power supply system adapted for use in emergency a direct current electrical power supply system adapted for use in emergency lighting systems and the like in association with an alternating current power source, said power supply system comprising a rectifier means, a supply battery having an output side connectible with an emergency lighting system or the like, conductor means connecting an input side of said battery in circuit with said rectifier means and connecting the latter with said alternating current power source, and means for regulating charging of said supply battery comprising at least one controllable conducting means, said means being connected in said conductor means so as to regulate the flow of charging current to said supply battery, and said charging regulating means also comprising a control circuit connected with said conducting means and with said supply battery and operable selectively to render said means conductive and nonconductive, said control circuit also including a means operable in response to a supply battery voltage to render said conducting means conductive for a first battery charging operation when said battery voltage is below a predetermined level and until said voltage level is attained, said control circuit including further a switching means and a low capacity control battery connected in circuit so as to receive an electrical charge during said first battery charging operation and to discharge thereafter whereby to provide a second supply battery charging operation, said control battery being further connected in said control circuit with said switching means in such manner as to provide during its discharging operation both energy supply and control functions, the control battery in its energy supply function serving to maintain said switching means in condition for a conductive condition of said conducting means, and the battery in its control function serving to determine the period of said second supply battery charging operation in accordance with the duration of its discharge period, the latter period being proportional to the control battery charge period and thus proportional to the period of said first supply battery charging operation.

21. A direct current electrical power supply system as set forth in claim 20 and including a temporary energy supply means connected in circuit with said switching means for cooperation with said control battery, said temporary energy supply means serving at commencement of a second supply battery charging operation to initially condition said switching means as aforesaid and said control battery serving thereafter to maintain said switching means in such condition for the duration of said second charging operation.

22. A direct current electrical power supply system as set forth in claim 20 and including a first monitoring and alarm circuit for said alternating current power source and its associated circuitry, said circuit comprising a malfunction responsive means connected in circuit with the alternating current source and circuitry and an alarm means connected in circuit with and operable in response to said malfunction responsive means, said monitoring and alarm circuit being further connected in circuit with said supply battery for a direct current power supply for operating said alarm means on malfunction in said alternating current power source or circuitry.

23. A direct current electrical power supply system as set forth in claim 20 and including a monitoring and alarm circuit for said supply battery and associated circuitry, said circuit comprising a malfunction responsive means connected in circuit with said supply battery and circuitry and an alarm means connected in circuit with and operable by said malfunction responsive means, said monitoring and alarm means being further connected in circuit with said alternating current power source for operating said alarm means on malfunction in said battery and circuitry.

24. A direct current electrical power supply system as set forth in claim 20 and including first and second monitoring and alarm circuits respectively for said alternating current power source and associated circuitry and for said supply battery and associated circuitry, each of said monitoring and alarm circuits comprising a malfunction responsive means and said means being connected respectively with said alternating current power source and circuitry and said supply battery and circuitry, said monitoring and alarm circuits further including an alarm means, and said alarm means being connected in circuit for operation by said supply battery and said alternating current source respectively in response to malfunction in said alternating current source and circuitry and said supply battery and circuitry.

25. A direct current electrical power supply system adapted for use in emergency lighting systems and the like in association with an alternating current power source, said power supply system comprising a rectifier means, a supply battery having an output side connectible with an emergency lighting system or the like, conductor means connecting an input side of said battery in circuit with said rectifier means and connecting the latter with said alternating current power source, and means for regulating charging of said supply battery comprising at least one controllable conducing means, said means being connected in said conductor means so as to regulate the flow of charging current to said supply battery, and said charging regulating means also comprising a control circuit connected with said conducting means and with said supply battery and operable selectively to render said means conductive and nonconductive, said control circuit also including a means operable in response to a supply battery voltage to render said conducting means conductive for a first battery charging operation when said battery voltage is below a predetermined level and until said voltage level is attained, said control circuit including said voltage responsive means being further operable when said predetermined battery voltage is attained to render said conducting means conductive for a second battery charging operation for a period of time in proportion to the time consumed in raising said battery voltage to said predetermined level, and said control circuit further including a low capacity control battery connected in circuit so as to receive an electrical charge during said first battery charging operation and to discharge during said second battery charging operation, the duration of the discharge period of said control battery being employed to regulate the period of said second charging operation in proportion to said first charging operation as aforesaid.

References Cited

UNITED STATES PATENTS

| | | | |
|---|---|---|---|
| 2,137,349 | 11/1938 | Rezos | 340—253 |
| 2,759,177 | 8/1956 | Hightower | 340—253 |
| 3,018,432 | 1/1962 | Palmer | 323—66 |
| 3,204,193 | 8/1965 | Rhyne | 340—249 X |
| 3,281,638 | 10/1966 | Crawford | 320—40 |
| 3,302,091 | 1/1967 | Henderson | 320—48 |
| 3,310,724 | 3/1967 | Grafham | 320—39 |
| 3,321,690 | 5/1967 | McCarthy et al. | 320—40 |
| 3,321,754 | 5/1967 | Grimm et al. | 340—249 |
| 3,329,882 | 7/1967 | Sobel | 320—39 |
| 3,356,922 | 12/1967 | Johnston | 320—40 |
| 3,379,953 | 4/1968 | Field | 320—34 |

JOHN F. COUCH, *Primary Examiner.*

STANLEY WEINBERG, *Assistant Examiner.*

U.S. Cl. X.R.

320—23, 48; 340—249